Nov. 28, 1961 S. C. ESTEVE 3,010,511
SYSTEM FOR THE MECHANICAL MANUFACTURE BY MEANS OF INJECTING
OF EVERY TYPE OF ARTICLES AND LOOSE PARTS
Filed Dec. 10, 1957 3 Sheets-Sheet 1
FIG 1
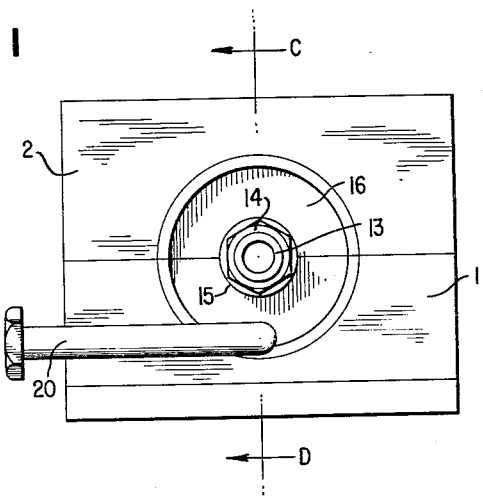
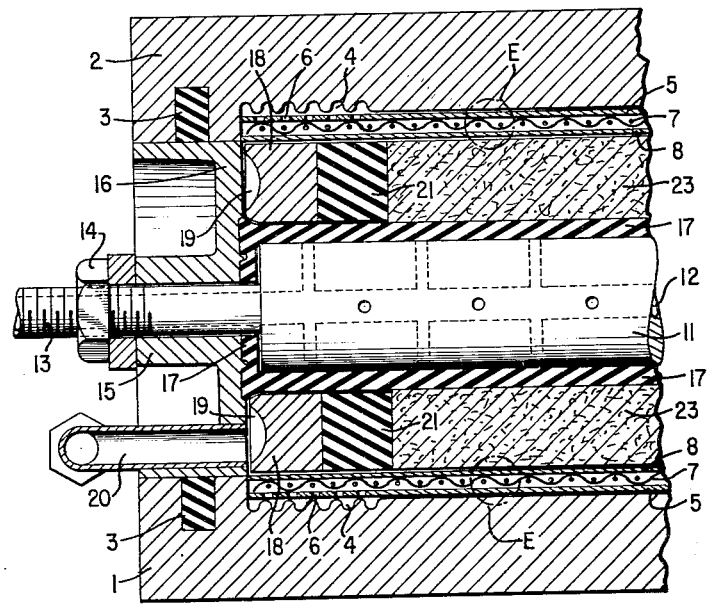
FIG 3
INVENTOR.
SEBASTIAN CASANOVA ESTEVE
BY
ATTORNEYS

INVENTOR.
SEBASTIAN CASANOVA ESTEVE

Nov. 28, 1961  S. C. ESTEVE  3,010,511
SYSTEM FOR THE MECHANICAL MANUFACTURE BY MEANS OF INJECTING
OF EVERY TYPE OF ARTICLES AND LOOSE PARTS
Filed Dec. 10, 1957  3 Sheets-Sheet 3
FIG 5
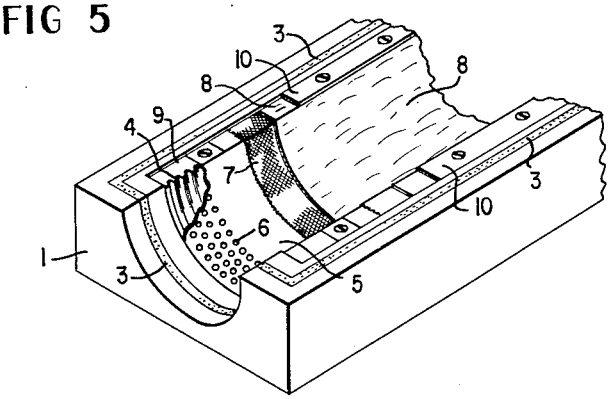
FIG 6
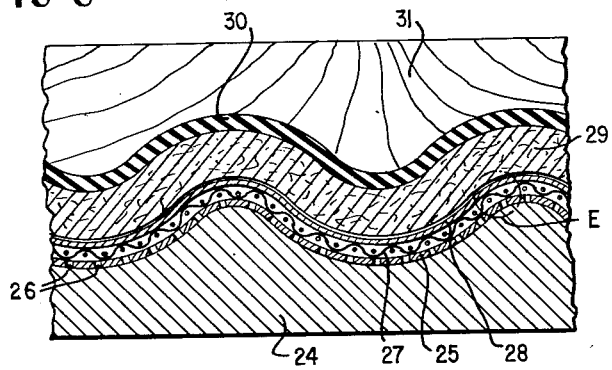
FIG 7
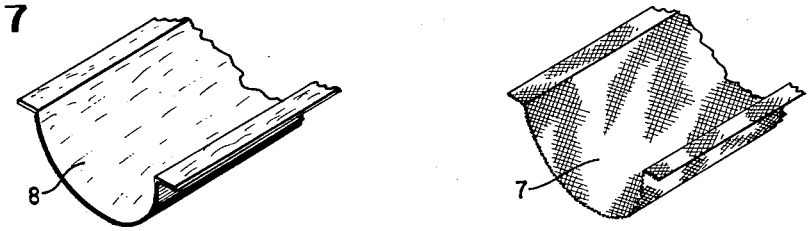
FIG 8
FIG 9
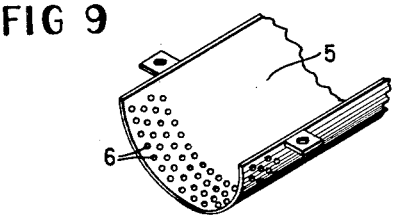
INVENTOR.
SEBASTIAN CASANOVA ESTEVE
BY
ATTORNEYS.

United States Patent Office 3,010,511
Patented Nov. 28, 1961

3,010,511
SYSTEM FOR THE MECHANICAL MANUFACTURE BY MEANS OF INJECTING OF EVERY TYPE OF ARTICLES AND LOOSE PARTS
Sebastian Casanova Esteve, 3 Maria de Molina, Valencia, Spain
Filed Dec. 10, 1957, Ser. No. 701,779
5 Claims. (Cl. 162—382)

My present invention relates to an improved mold for the manufacture of articles of a moisturized molding medium, such as fibrocement (amianthus-cement).

The object of the invention is to provide a mold structure for manufacturing fibrocement articles by means of pressure injection of a more or less fluid amianthus-cement compound into a mold.

At present, articles composed of an amianthus-cement compound such as water pipes, and those for other liquids, channels, chimneys, tanks, and undulated sheets for roofs, are manufactured by various casting methods. But all attempts to manufacture these articles by pressure injecting a pasty mass of amianthus-cement into a mold have been a complete failure. The manufacturing method by means of pressure injection of a pasty fibrocement mass makes it necessary to expel a quantity of water contained in the mass in order to make binding possible, and moreover it is necessary to compress the mass by exerting some pressure in order to compact it with the purpose of giving the manufactured articles a proper density and resistance, for example such as is necessary for pipes conducting liquids under pressure.

The attempts made up to now employing the injection method have met with the disadvantage that the pasty mass could not fill the mold completely owing to the fact that it became stuck and prevented further advance of the mass in the mold. This occurred because as the mass necessarily had to be dehydrated, it was thought to be necessary to employ permeable molds provided with some holes which make it possible to let the water escape freely in proportion to the penetration of the mass into the mold. But the result of this escape of water was the diminution of fluidity of the paste, and by growing thicker, it arrived at a condition wherein it became a solid body and its fibrous surfaces rubbed along the walls of the mold and thus the mass got stuck and stopped its progress.

My invention comprises a proper mold to perform molding with which the previously mentioned difficulties are overcome, i.e. with it the pasty mass, which is introduced into the mold under pressure, remains at proper fluidity and fills the mold completely, and progresses smoothly without sticking. According to my invention, an exterior mold composed of two halves is used with means to close them hermetically, and their interior walls, being covered by a mantle which comprises an assembly of three layers that are: a partially impermeable metallic plate, i.e. smooth with some holes only at its ends; a wire netting with more or less wide meshes; and a very closely woven linen or tissue or any other textile fiber. The inner surface situated at the ends of the mold is provided with some grooves and on this zone of grooves is placed a metallic member with a slot and grooves as described below. Moreover, a rubber member which separates the pasty mass from said metallic member is provided, and there is also an outlet for water and air and an inlet for air under pressure.

The method of operation is as follows: the amianthus-cement mass is injected in a liquid state into the mold and the water that comes out of it is retained in the mold while only the air is let out. The release of the air is regulated in such a way that there is always at least a preselected interior pressure in the mold. The water is retained in the mantle and this has an aqueous surface that is in contact with the pasty mass by means of which it is lubricated and it thus progresses smoothly in the mold without sticking. According to the type of article to be manufactured, the water contained in the mantle is let out by means of valves either before or after the mass has completely filled the mold. After this, the compacting takes place by means of an inflatable core with which the molded mass is compressed by displacing one of the parts of the mold.

The invention is an improvement of the mold disclosed in copending U.S. patent application, Serial No. 681,416, filed February 5, 1957.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is an elevational view of the end of the mold for the manufacture of pipes;

FIG. 3 is a vertical section of FIG. 1 taken along line C—D;

FIG. 5 is a perspective view of the end of the half mold for pipes with the inflatable core removed;

FIG. 6 is a section of part of the mold for an undulated plate, and

FIGS. 7, 8 and 9 are perspective views of the individual members that compose the porous mantle.

Figure 2:
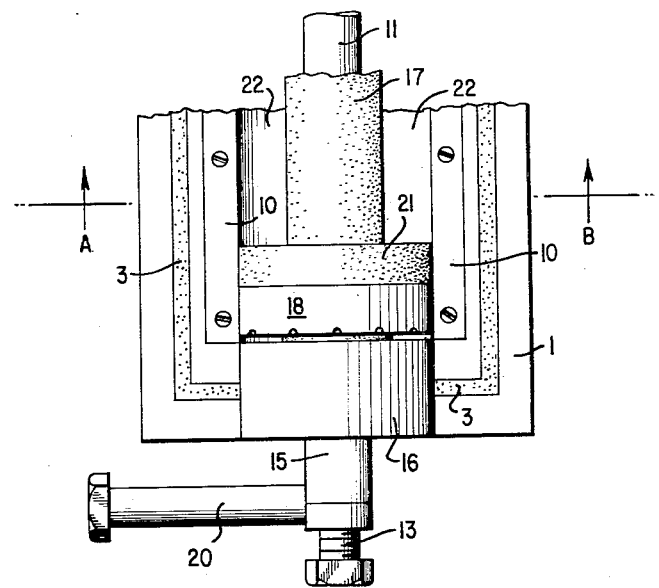
FIG. 2 is a horizontal section of one mold half of FIG. 1, illustrating the inflatable core placed on it.

The mold for the manufacture of pipes that is given as an example, comprises in accordance with the drawings two mold halves of which 1 is the inferior and 2 the superior. FIGS. 2, 3 and 5 illustrate only a part of the end of the mold, as it may refer to a mold for the manufacture of straight pipes, knee pipes or the end of an arm for branch pipes. On the surfaces of contact of said two halves of the mold is a hermetical connecting piece 3 that is introduced into a corresponding duct so that when placing one half of the mold on the other, a hermetical closure is produced. On the inner surface of said two mold halves 1 and 2 and at the ends, are some canals 4.

A mantle E is placed on the inner surface covering same, this mantle being composed of three layers that are: a metallic plate 5 (of which part can be seen in FIG. 9) with holes 6 in a zone near its ends, which holes must coincide with the zone of canals 4 of the inner surface of the mold; a wire cloth 7 (FIG. 8) which is situated directly on the plate 5; and finally a linen or texture 8 (FIG. 7) of any natural or synthetic textile fiber which is placed on the wire cloth 7. This mantle E is also divided into two parts in order to cover with each the inner surface of a mold half, the sides of which are folded into laps that fit into the grooves 9 which exist in the mold halves 1 and 2. Said laps of the mantle are fastened to the mold halves by means of elongated plates 1 that are screwed on.

The inflatable core or interior mold surface is composed of a hard core 11 which has a central and longitudinal duct 12 with transverse passages for conducting air being communicated with said duct 12 in connection with the pipe 13 through which the air is introduced into the interior of the inflatable core. The core 11 is completely covered by a rubber tube 17 forming a dilatable pneumatic chamber around it. The opening through the exterior mold end is closed with the metallic plug 16 having a cylindrical body 15 through which the pipe 13 passes and is fastened to said body by means of nut 14. The plug 16 also serves as head and bearing of the inflatable core or interior mold in order to maintain it horizontally in the exterior mold composed of the two halves 1 and 2.

A ring 18 made of metal or any other hard material is placed at the plug 16 and at the inner part of the mold and encircles the inflatable core. This ring 18 has a circular duct 19 situated at the contact surface with the plug 16, and there is also a tube 20 communicating with said duct 19 for the outlet of air and water from the interior of the mold. In the example of FIG. 2, this tube 20 is bent at an angle. There is another ring 21 made of rubber or any other flexible material close to the ring 18 also inside the mold and also encircling the inflatable core; this ring 21 separates the fibrocement mass 23 from the ring 18 and serves to give a clean finish to the edge of the tube 23.

Figure 4:
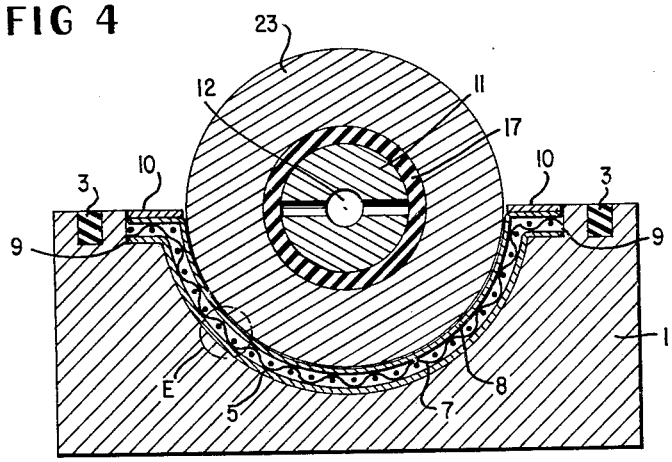
FIG. 4 is a transverse vertical section taken along plane A—B of FIG. 2.

In FIG. 2 the molding space 22 is empty but in FIGS. 3 and 4, this space appears occupied by the amianthus-cement mass 23 which constitutes the molded fibrocement pipe.

The working process for the use of the mold to manufacture pipes as shown in the drawings is as follows: the material employed is a mixture of cement, amianthus and water which is mixed to form a fluid paste. Said mixture is injected into the interior of the mold composed of the two halves 1 and 2 by means of a known pressure device. The mold is kept firmly closed by placing it into a press. The paste can be introduced at any point lengthwise of the mold or at its end. The fluid paste can also be introduced at several inlets at the same time if the length of the pipe to be molded requires it. The tests carried out have made it evident that with small articles it is preferable to inject into the center of one of the surfaces of the mold and to let the water out at the ends.

When the fluid and pasty mass 23 penetrates the mold under pressure, the water of this mass runs through the texture 8 and lodges among the meshes of the wire cloth 7; the interlaced and bent wires of which provide it with sufficient space. The water lodged among the meshes of the wire cloth 7 circulates longitudinally towards the ends of the mold until it reaches the holes 6 of the plates 5 and runs through them to the ducts 4 and from there to the ducts 19 through grooves or slots 32 in the ring 18. While the paste is entering into the mold, the water is retained in it in order to keep the mantle E constantly filled with water and to facilitate the smooth slipping of the paste and to avoid its sticking. The air is let out in a restricted way to maintain a certain pressure in the mold. After the mold has been filled with paste, the water is let out through the duct 20 by opening the valves. Then air is introduced through the mouth piece 13 into the inner mold or inflatable core and when the rubber tube 17 expands, a strong pressure on the inner surfaces of the molded pipe 23 is produced which expels more water which runs lengthwise of the mantle E until it reaches the outlet 20 where it is let out freely. Thus, the article is compacted after which the air is let out of the core or inner mold. When the rubber tube 17 returns to its original shape, the pipe 23 becomes detached and thus it is possible to extract it. Finally the mold is taken out of the press which held the mold halves together during the above working process. The core is removed from the interior of the molded pipe 23 which is of sufficient consistency to support itself on its own without any need of supports until its binding is complete.

FIG. 6 illustrates an example of applying the method and mold to the manufacture of undulated plates. In this case, the mold will be an undulated surface 24 on which the plate 25 with the holes 26 situated at one end is placed. On the plate 25 the wire netting 27 is placed and on this latter one the linen or texture 28 is placed and these three layers 25, 27 and 28 make up the mantle E. 29 is the molded amianthus-cement mass having the shape of an undulated plate, and 30 the rubber that covers the superior body 31. These parts 30 and 31 move vertically and exert pressure on the paste to dehydrate it.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A mold for the injection molding of a fibrillar plastic in paste form, comprising a body having a wall defining a molding chamber, a moisture retaining covering lining said wall to retain moisture on the molding surface thereof, means for selectively removing water from the vicinity of said covering, means on said body for selectively extracting the moisture from the paste, an impermeable substantially smooth plate contacting said wall, said plate having openings therethrough in a zone adjacent at least one end thereof, a sieve contacting the chamber-facing surface of the plate, a closely woven fabric contacting the chamber-facing surface of the sieve and acting as one of the molding surfaces, said molding chamber being annular in cross-section, a plug closing one end of said molding chamber, a pipe passing through said plug, said water removing means including a metal ring in juxtaposition to said plug and encircled by said lining, said ring defining a plurality of radial slots in the surface adjacent the plug to communicate with said covering and an annular groove in the surface of the ring adjacent the plug and in communication with said slots and said pipe, said wall defining canals near the end thereof which is adjacent the openings in said plate, and an annular resilient spacer abutting against said ring on the side opposite said plug and acting as one of the molding surfaces.

2. In a mold for the injection molding of a fibrillar plastic material in paste form, a mold part having a wall of the same general configuration as the desired molding surface, a moisture retaining covering lining the wall of the mold part and defining one of the molding surfaces, said covering including an impermeable substantially smooth plate contacting said wall and defining openings therethrough, a sieve contacting the surface of the plate, and a closely woven fabric contacting the surface of the sieve and acting as one of the molding surfaces, means spaced from said molding surface and defining therewith a molding chamber, a plug closing one end of the molding chamber, a pipe passing through said plug, a rigid member formed of hard material disposed between the covering and said means and in juxtaposition to said plug, said member defining means for communicating said covering with said pipe, and a resilient spacer having one side abutting against said member and the other side acting as one of the molding surfaces.

3. A mold for the injection molding of a fibrillar plastic material in paste form comprising two mold parts each having an interior wall and together defining a cylindrical molding chamber, the contacting surfaces of the mold parts being formed with grooves communicating with the molding chamber and a duct spaced from and surrounding the grooves, a hermetical connecting piece in each duct for hermetically sealing the molding chamber when the mold parts are held together, a moisture retaining covering lining the interior wall of each mold part to retain moisture on the molding surface thereof and having flaps disposed in said grooves, a plug closing one end of the molding chamber and in engagement with a portion of said hermetical connecting piece, a pipe passing through said plug, an annular metal ring disposed within the covering and in juxtaposition to said plug, said ring defining means for communicating said covering with said pipe, an annular resilient spacer having one side abutting against said ring and the other side acting as one of the molding surfaces, and core means within said chamber and selectively expansible for extracting the moisture from the paste.

4. A mold for the injection molding of a fibrillar plastic material in paste form comprising two mold parts each having an interior wall formed with canals at one end thereof and together defining a cylindrical molding chamber, the contacting surfaces of the mold parts being formed with grooves communicating with the molding chamber and a duct spaced from and surrounding the grooves, a hermetical connecting piece in each duct for hermetically sealing the molding chamber when the mold parts are held together, a moisture retaining covering lining the interior wall of each mold part and having flaps disposed in said grooves, each covering including an impermeable substantially smooth plate contacting said wall and defining openings therethrough in the vicinity of said canals, a sieve contacting the chamber-facing surface of the plate, and a closely woven fabric contacting the chamber-facing surface of the sieve and acting as one of the molding surfaces, a plug closing one end of the molding chamber and in engagement with a portion of said hermetical connecting piece, a pipe passing through said plug, an annular metal ring disposed within the covering and in juxtaposition to said plug, said ring defining a plurality of radial slots in the surface contacting the plug and in communication with said covering and an annular groove defined in the surface of the ring contacting the plug and communicating said slots with said pipe, an annular resilient spacer having one side abutting against said ring and the other side acting as one of the molding surfaces, and core means within said chamber and selectively expansible for extracting the moisture from the paste.

5. In a mold for the injection molding of a fibrillar plastic material in paste form, a mold part having a wall of the same general configuration as the desired molding surface, a moisture retaining covering lining the wall of the mold part and defining one of the molding surfaces, means spaced from said molding surface and defining therewith a molding chamber, a plug closing one end of the molding chamber, a pipe passing through said plug, a rigid member formed of hard material disposed between the covering and said means and in juxtaposition to said plug, said member defining means for communicating said covering with said pipe, and a resilient spacer having one side abutting against said member and the other side acting as one of the molding surfaces.

References Cited in the file of this patent
UNITED STATES PATENTS

| | | |
|---|---|---|
| 1,226,470 | Coolidge | May 15, 1917 |
| 1,272,566 | Sutherland | July 16, 1918 |
| 1,552,064 | Lake | Sept. 1, 1925 |
| 2,802,404 | Taylor | Aug. 13, 1957 |